(12) United States Patent
Umeyama et al.

(10) Patent No.: US 10,128,476 B2
(45) Date of Patent: Nov. 13, 2018

(54) SEALED BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Hiroaki Imanishi, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 274 days.

(21) Appl. No.: 15/264,792

(22) Filed: Sep. 14, 2016

(65) Prior Publication Data
US 2017/0098807 A1   Apr. 6, 2017

(30) Foreign Application Priority Data

Oct. 5, 2015   (JP) .................. 2015-197580

(51) Int. Cl.
*H01M 2/12* (2006.01)
*H01M 2/34* (2006.01)
*H01M 2/02* (2006.01)
*H01M 10/0525* (2010.01)

(52) U.S. Cl.
CPC ......... *H01M 2/1229* (2013.01); *H01M 2/024* (2013.01); *H01M 2/345* (2013.01); *H01M 10/0525* (2013.01); *H01M 2/1247* (2013.01); *H01M 2200/20* (2013.01); *H01M 2220/20* (2013.01)

(58) Field of Classification Search
CPC .... H01M 2/12; H01M 2/1229; H01M 2/1276; H01M 2/1294; H01M 2200/1294
See application file for complete search history.

(56) References Cited

U.S. PATENT DOCUMENTS

| | | | | |
|---|---|---|---|---|
| 5,741,606 A * | 4/1998 | Mayer | ................. | H01M 2/1229 429/53 |
| 7,807,282 B2 * | 10/2010 | Hamada | .............. | H01M 2/0285 429/54 |
| 2011/0008654 A1 * | 1/2011 | Kim | ...................... | H01M 2/022 429/56 |
| 2012/0196163 A1 * | 8/2012 | Shimizu | .................. | H01M 2/12 429/57 |
| 2013/0098912 A1 * | 4/2013 | Scagliarini | .......... | H01M 2/1205 220/89.1 |

(Continued)

FOREIGN PATENT DOCUMENTS

| | | |
|---|---|---|
| JP | H05-325929 A | 12/1993 |
| JP | 9-120811 A | 5/1997 |
| JP | 2001-185113 A | 7/2001 |

(Continued)

*Primary Examiner* — Ula C Ruddock
*Assistant Examiner* — Amanda J Barrow
(74) *Attorney, Agent, or Firm* — Sughrue Mion, PLLC

(57) ABSTRACT

A sealed battery with a battery element housed in a sealed casing. The sealed battery includes a valve brought into a closed state when a pressure of a gas in the casing is less than a first pressure P1, into an open state when the pressure is more than or equal to the first pressure P1 and less than a second pressure P2, and into the closed state when the pressure is more than or equal to the second pressure P2, and a safety mechanism configured to, when the internal pressure reaches a third pressure P3 exceeding the second pressure P2, operate in accordance with the third pressure P3.

3 Claims, 7 Drawing Sheets

F2

(56) References Cited

U.S. PATENT DOCUMENTS

| | | | |
|---|---|---|---|
| 2014/0162092 A1* | 6/2014 | Reitzle | H01M 2/1229 429/54 |
| 2017/0018748 A1* | 1/2017 | Matsuura | H01M 2/1223 |

FOREIGN PATENT DOCUMENTS

| | | |
|---|---|---|
| JP | 2005-340053 A | 12/2005 |
| JP | 2012-9287 A | 1/2012 |
| WO | 2011/145263 A1 | 11/2011 |

\* cited by examiner

SEALED BATTERY

This nonprovisional application is based on Japanese Patent Application No. 2015-197580 filed on Oct. 5, 2015 with the Japan Patent Office, the entire contents of which are hereby incorporated by reference.

BACKGROUND OF THE INVENTION

Field of the Invention

The present invention relates to a structure of a sealed battery.

Description of the Background Art

A sealed battery including a battery element in a sealed casing is disclosed in Japanese Patent Laying-Open No. 2001-185113.

Japanese Patent Laying-Open No. 2001-185113 points out that an issue will arise in that when a battery is used as an in-vehicle battery which will be used for long years, the battery internal pressure is increased by gas generation in the battery through charging/discharging or use in high-temperature environments. Employed as a solution therefor is a safety mechanism such as a current-interrupting valve for interrupting a current path when the battery internal pressure rises to a predetermined internal pressure, and an explosion-proof valve which is partly cracked when the battery internal pressure rises to a predetermined internal pressure, thereby preventing a battery container itself from exploding.

SUMMARY OF THE INVENTION

When the battery internal pressure rises to a certain degree of internal pressure, however, a load is imposed on the safety mechanism, such as the above-described current-interrupting valve and explosion-proof valve, or an airtightly-welded location between a main container and a lid member constituting a battery container, even if these valves do not operate. As a result, there is a concern that the safety mechanism may be reduced in working pressure and/or the weld strength may be reduced because of long-term use. Therefore, the period of use (durable period) set for a sealed battery is short.

The present invention was therefore made to solve the problem, and has an object to provide a sealed battery having a structure capable of preventing reduction in working pressure of a safety mechanism and/or reduction in weld strength.

This sealed battery is a sealed battery with a battery element housed in a sealed casing. The sealed battery includes a valve brought into a closed state when an internal pressure of a gas in the casing is less than a first pressure, into an open state when the internal pressure is more than or equal to the first pressure and less than a second pressure, and into the closed state when the internal pressure is more than or equal to the second pressure, and a safety mechanism configured to, when the internal pressure reaches a third pressure exceeding the second pressure, operate in accordance with the third pressure.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
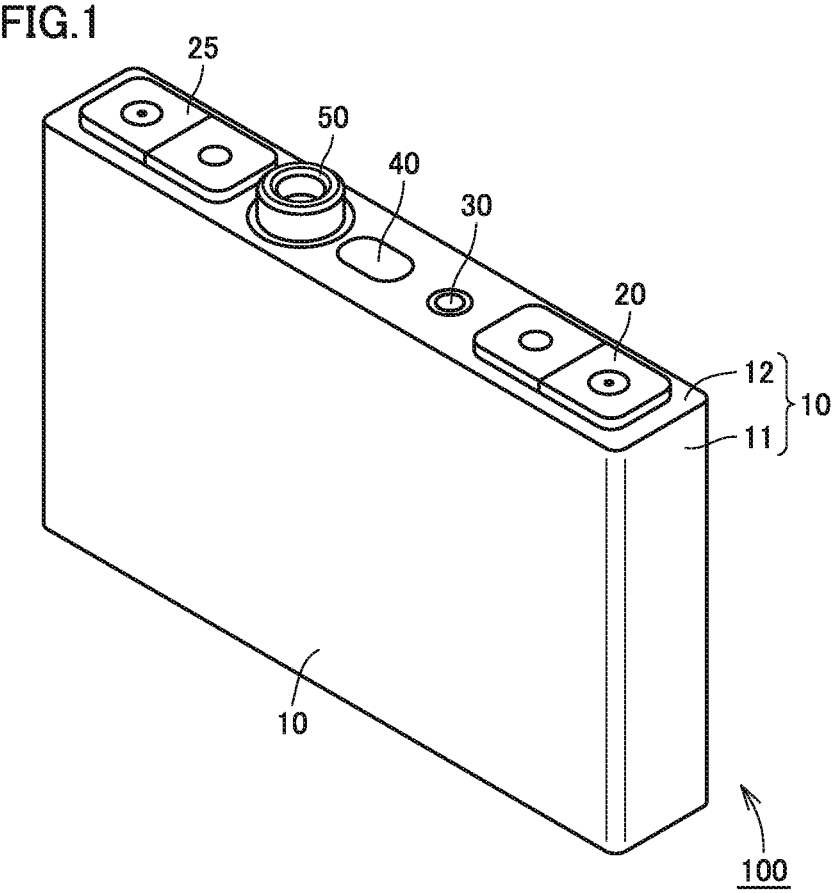
FIG. 1 is a perspective view showing the appearance of a sealed battery of an embodiment.

The structure of a sealed battery according to an embodiment will be described below with reference to the drawings. When the number, amount, material, and the like are mentioned, the scope of the present invention is not necessarily limited to that number, amount, material, and the like unless otherwise specified. The same or corresponding parts have the same reference characters allotted, and detailed description thereof may not be repeated. It is intended as of filing to combine features described in embodiments as appropriate. Moreover, the dimensional relationship among length, width, thickness, depth, and the like is varied as appropriate for clarification and simplification of the drawings, and does not indicate an actual dimensional relationship.

Embodiment: Sealed Battery 100

Figure 2:
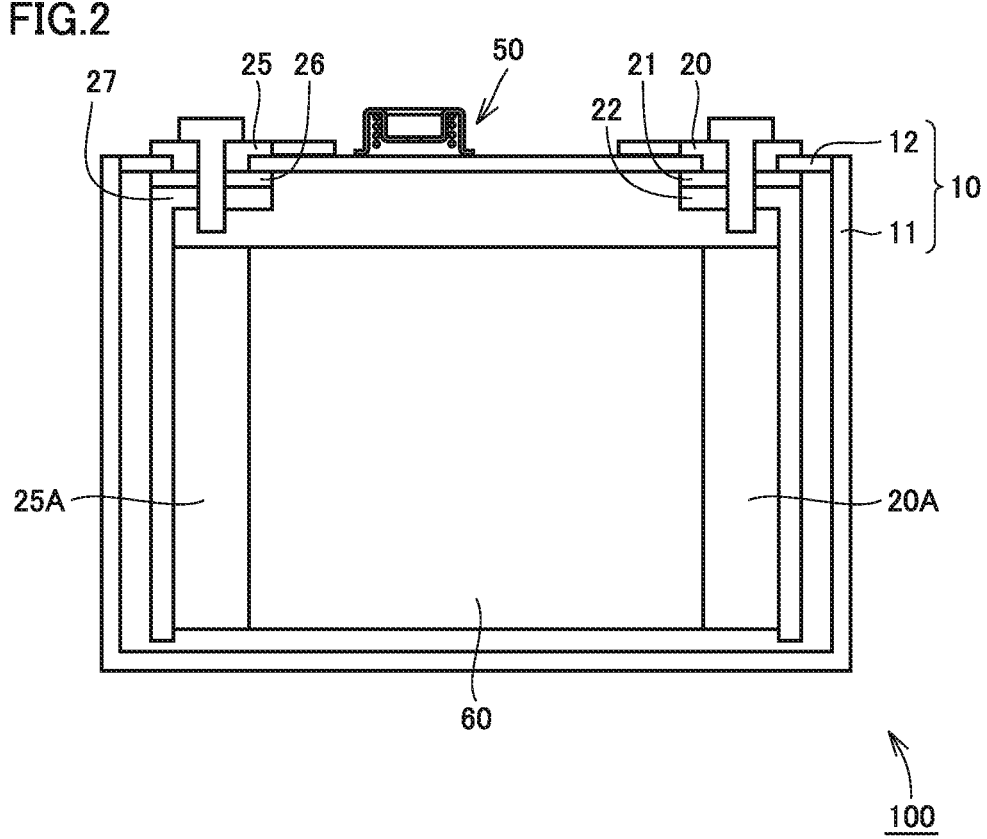
FIG. 2 is a cross sectional view showing the internal structure of the sealed battery of an embodiment.

Referring to FIGS. 1 and 2, the structure of a sealed battery 100 according to an embodiment will be described. FIG. 1 is a perspective view showing the appearance of sealed battery 100, and FIG. 2 is a cross sectional view showing the internal structure of sealed battery 100.

Referring to FIG. 1, sealed battery 100 is a sealed battery with a battery element housed in a sealed casing 10. Casing 10 includes a container body 11 and a lid member 12. Aluminum or the like is used for each of container body 11 and lid member 12. Lid member 12 is bonded airtightly to container body 11 by way of weld-bonding or the like.

Lid member 12 is provided with an anode terminal 20, a cathode terminal 25, an infusion plug 30, an explosion-proof valve 40, and a valve 50. An electrolyte is introduced into casing 10 through infusion plug 30. Explosion-proof valve 40 has a function of becoming cracked when the internal pressure of casing 10 rises to a predetermined internal pressure to prevent explosion of casing 10 itself. The structure of valve 50 will be described later in detail.

Referring to FIG. 2, a current-interrupting valve 21 serving as a current-interrupting mechanism and an anode collecting electrode 22 are connected to anode terminal 20. Current-interrupting valve 21 interrupts the current path when the internal pressure of casing 10 rises to the predetermined internal pressure. Anode collecting electrode 22 is connected to an anode exposed portion 20A of a coiled electrode body 60 arranged in casing 10.

A current-interrupting valve 26 serving as a current-interrupting mechanism and a cathode collecting electrode 27 are connected to cathode terminal 25, similarly to anode terminal 20. Current-interrupting valve 26 interrupts the current path when the internal pressure of casing 10 rises to the predetermined internal pressure. Cathode collecting electrode 27 is connected to a cathode exposed portion 25A of coiled electrode body 60 arranged in casing 10. Current-interrupting valves 21 and 26 may be arranged on either the anode side or the cathode side.

The electrolyte, coiled electrode body 60, current-interrupting valves 21 and 26, anode collecting electrode 22, cathode collecting electrode 27, and the like in casing 10 constitute the battery element.

Valve 50

Figure 3:
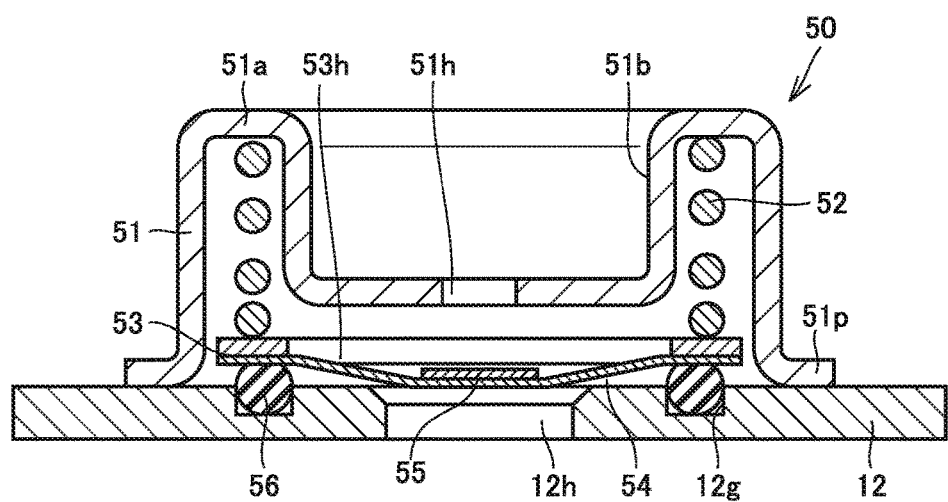
FIG. 3 is a vertical sectional view showing the structure of a valve of an embodiment.
Figure 4:
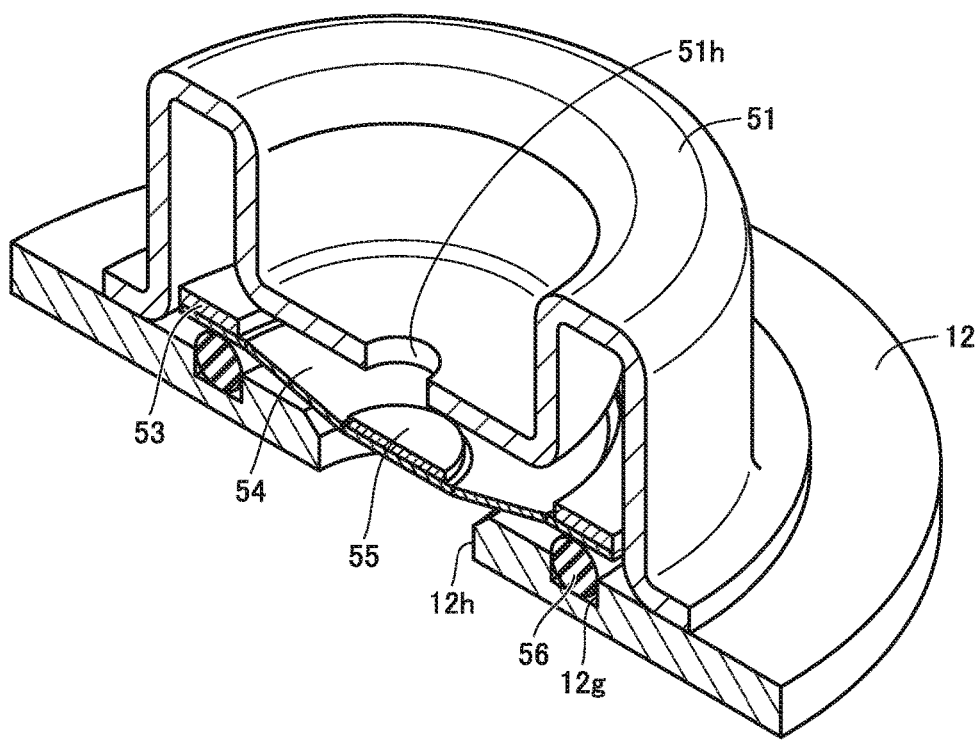
FIG. 4 is a perspective sectional view showing the structure of the valve of embodiment.

Next, referring to FIGS. 3 and 4, the structure of valve 50 will be described in detail. FIG. 3 is a vertical sectional view showing the structure of valve 50, and FIG. 4 is a perspective sectional view showing the structure of valve 50.

Referring to both the drawings, valve 50 is provided to cover an air vent 12$h$ formed in lid member 12 of casing 10. Lid member 12 has a thickness of about 1.5 mm, and air vent 12$h$ has a diameter of about ϕ3 mm. Valve 50 has a cap 51 at a position opposed to air vent 12$h$, cap 51 having an exhaust hole 51$h$ through which gas inside casing 10 is emitted, a reverse plate 54 housed in this cap 51 and reversed between a state where exhaust hole 51$h$ is opened and a state where exhaust hole 51$h$ is closed, and a coil spring 52 housed in cap 51 and serving as an elastic member that biases reverse plate 54 toward air vent 12$h$. Coil spring 52 is merely an example of the elastic member. The elastic member is not limited to coil spring 52, but anything that has a similar function can be adopted.

Reverse plate 54 is made of aluminum, and has a thickness of about 0.1 mm to 0.3 mm. Reverse plate 54 has a shape projecting toward air vent 12$h$ in a normal state, but is reversed to project toward exhaust hole 51$h$ when a predetermined pressure is applied from the air vent 12$h$ side. A closure pad 55 made of an elastic member (rubber) or the like for reliably closing exhaust hole 51$h$ when reverse plate 54 is reversed is provided at the central portion of reverse plate 54. If it is possible to reliably close exhaust hole 51$h$ with reverse plate 54, closure pad 55 may not be provided.

In the present embodiment, an annular groove 12$g$ surrounding air vent 12$h$ annularly is provided. This annular groove 12$g$ accommodates an O-ring 56 serving as an airtightness holding member. Annular groove 12$g$ has an inner diameter of about ϕ8 mm, an outer diameter of about ϕ11 mm, and a groove depth of about 1.0 mm. O-ring 56 has a wire diameter of about 1.5 mm, and projects from annular groove 12$g$ by about 1.5 mm. The material of O-ring 56 is ethylene-propylene-diene rubber (EPDM), nitrile rubber (NBR) or the like.

O-ring 56 is housed such that part of its wire diameter protrudes from the surface of lid member 12, thereby coming into contact with the outer peripheral region of reverse plate 54 to improve airtightness. The sealant is not limited to O-ring 56, but may be formed by punching a sheet-shaped sealant circularly.

Cap 51 has a shape whose central portion 51$b$ is recessed in cross section. The material of cap 51 is aluminum, and exhaust hole 51$h$ has an inner diameter of about ϕ1 mm. Coil spring 52 is housed inside projection portion 51$a$ provided around cap 51, with one end of coil spring 52 being in contact with the inside of cap 51, and the other end of coil spring 52 being in contact with reverse plate 54.

An annular spacer 53 made of metal is arranged between the other end of coil spring 52 and reverse plate 54 in order to make loads on O-ring 56 uniform. Spacer 53 is made of aluminum, SUS or the like, and has a thickness of 0.3 mm to 0.5 mm.

An opening 53$h$ is provided at the central portion of spacer 53 so as not to obstruct the reversal operation of reverse plate 54. When reverse plate 54 is reversed, reverse plate 54 passes through opening 53$h$ of spacer 53 to deform into a projecting shape.

Although spacer 53 and reverse plate 54 are made of different members in the present embodiment, spacer 53 having a uniform thickness may be adopted, and reverse plate 54 may be molded integrally with spacer 53 by molding the reverse plate at the central portion of spacer 53 using press molding or the like. The number of components can thus be reduced.

Reverse plate 54 is pressed against O-ring 56 by the biasing force of coil spring 52, so that the contact pressure of O-ring 56 is increased. As a result, the state where communication between air vent 12$h$ and the outside of casing 10 is interrupted is maintained. As a method of fixing cap 51, a peripheral portion 51$p$ of cap 51 may be laser-bonded to lid member 12.

(Operation of Valve 50)

Figure 5:
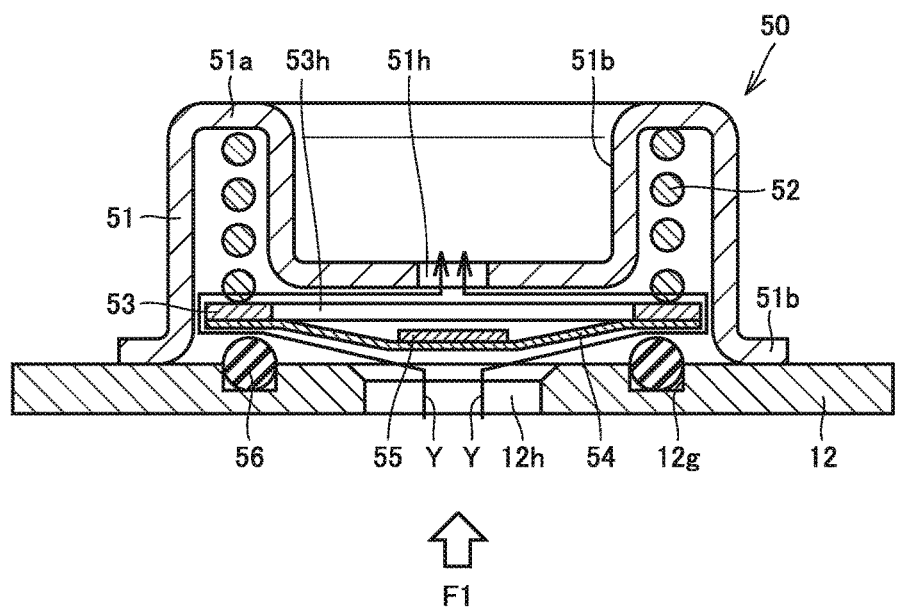
FIG. 5 is first vertical sectional view showing an operating state of the valve of an embodiment.
Figure 6:
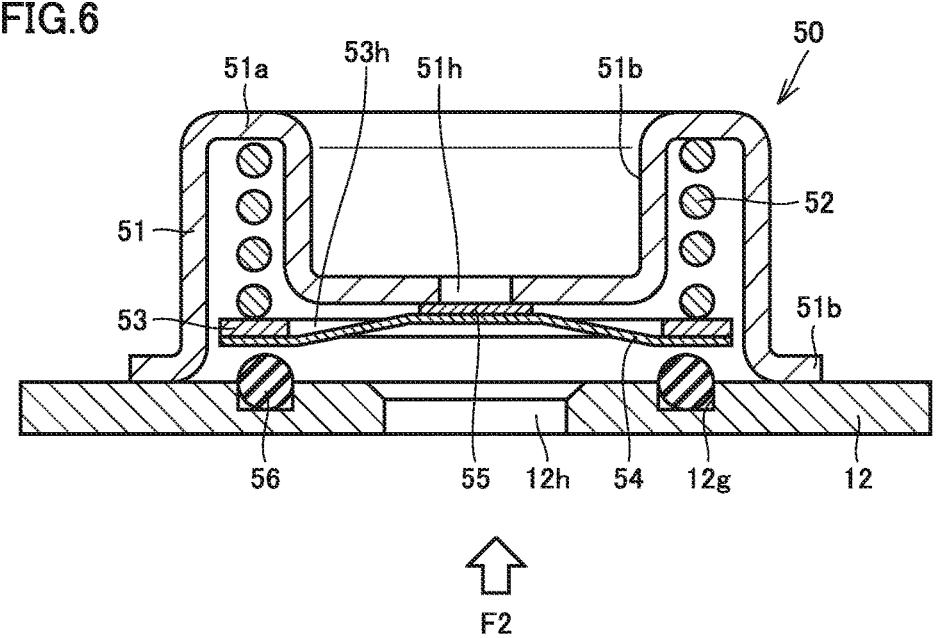
FIG. 6 is second vertical sectional view showing an operating state of the valve of an embodiment.
Figure 7:
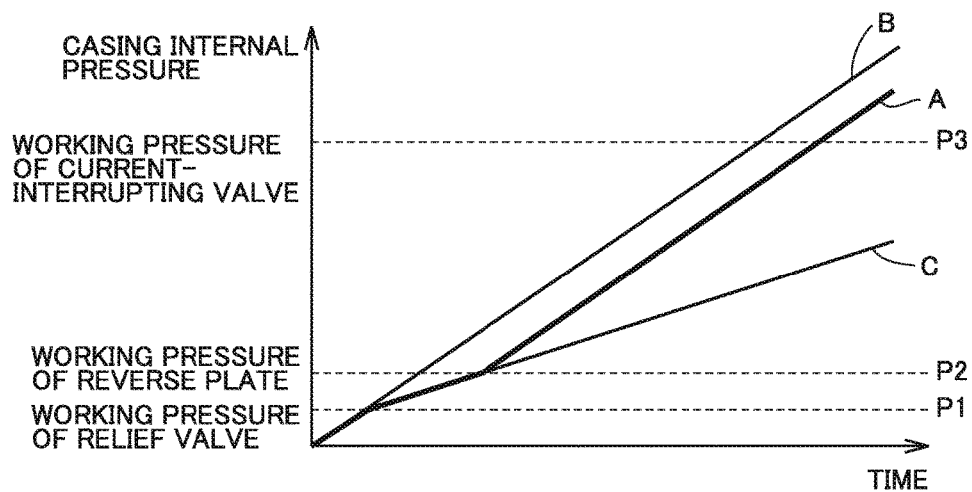
FIG. 7 shows internal pressure transitions when the internal pressure of a battery casing is normal and abnormal.

Next, referring to FIGS. 3 and 5 to 7, the operation of valve 50 having the above-described structure will be described. FIGS. 5 and 6 are first and second vertical sectional views showing the operating state of valve 50, respectively, and FIG. 7 is a timing chart showing the operating state of valve 50.

First, referring to FIG. 3, in a normal use state, reverse plate 54 is pressed against O-ring 56 by the biasing force of coil spring 52 when the internal pressure of casing 10 is less than a first pressure P1 (working pressure of valve 50) to maintain the state where communication between air vent 12$h$ and the outside of casing 10 is interrupted. The inside of casing 10 of sealed battery 100 is thus sealed airtightly.

Next, referring to FIG. 5, reverse plate 54 is raised by the internal pressure (F1) applied to reverse plate 54 until the internal pressure of casing 10 reaches a second pressure (working pressure of the reverse plate) after exceeding the first pressure (working pressure of valve 50), and moves toward exhaust hole 51$h$ against the biasing force of coil spring 52. Accordingly, the contact pressure of O-ring 56 drops, leaving a gap between reverse plate 54 and O-ring 56. As a result, gas passes along the interface between reverse plate 54 and O-ring 56, causing air vent 12$h$ and exhaust hole 51$h$ to communicate with each other.

The airtight state of casing 10 is thereby released, so that a gas emission path Y along which air vent 12$h$ and exhaust hole 51$h$ communicate with each other is formed in cap 51. As a result, gas inside casing 10 is emitted to the outside, which suppresses an increase in internal pressure of casing 10.

When the internal pressure of casing 10 is reduced by gas emission to the outside, spacer 53 and reverse plate 54 are pressed against air vent 12$h$ by the elastic force of coil spring 52 to restore the state where communication between air vent 12$h$ and the outside of casing 10 is interrupted as shown in FIG. 3, thereby bringing the inside of casing 10 into the airtight state again. By thus repeating the sealing and gas emission, the internal pressure of casing 10 can always be maintained at less than or equal to a certain pressure.

Next, referring to FIG. 6, in an abnormal state of the battery element (overcurrent and/or heated condition), gas is continuously emitted more than in the state shown in FIG. 5. If the relationship "amount of gas emission<amount of gas generation" holds, the internal pressure of casing 10 continues rising.

As a result, when the internal pressure of casing 10 becomes more than or equal to the second pressure (P2), then, reverse plate 54 is reversed toward exhaust hole 51$h$.

As a result, exhaust hole 51h is closed by reverse plate 54. Gas emission through exhaust hole 51h is thereby stopped.

Thereafter, if the internal pressure rises further to exceed a third pressure (P3), current-interrupting valves 21 and 26 serving as a safety mechanism operate to interrupt the current path. Specifically, the current path between anode terminal 20 and anode collecting electrode 22 is interrupted by current-interrupting valve 21, and the current path between cathode terminal 25 and cathode collecting electrode 27 is interrupted by current-interrupting valve 26. If the internal pressure rises even further, explosion-proof valve 40 serving as a safety mechanism functions and becomes cracked to prevent explosion of casing 10 itself.

In the present embodiment, first pressure P1 is less than or equal to about 0.2 MPa, the second pressure (P2) at which reverse plate 54 is reversed is about 0.4 MPa, the third pressure (P3) at which current-interrupting valves 21 and 26 serving as a safety mechanism operate is about 1.2 MPa. In the present embodiment, explosion-proof valve 40 operates upon receipt of a predetermined pressure higher than the third pressure (P3).

Now referring to FIG. 7, the normal state and abnormal state of the internal pressure of the battery casing will be described. The "abnormal state of battery casing internal pressure" refers to a state where a large load is imposed on the battery casing due to overheating, overcharging or the like.

In the normal state (around P1), gas is generated inside sealed battery 100 by conducting charging/discharging, leaving sealed battery 100 at a high temperature, and/or the like. A relief valve usually provided is a mechanism for emitting this gas to the outside. When the internal pressure exceeds pressure P3, for example, the current-interrupting valves (or the explosion-proof valve) serving as a safety mechanism operate, but the safety mechanism does not operate when the internal pressure is less than pressure P3.

The internal pressure of sealed battery 100 may rise to P3, and in this state, a load is imposed on a weld and the like. Therefore, the sealed battery will be degraded in reliability if the relief valve is not provided.

In the abnormal state of battery casing internal pressure, the internal pressure rises rapidly from P2 to P3. If the relief valve is not provided, the internal pressure rises linearly from P2 to P3 (line B). If the relief valve is provided, gas is emitted, so that the rise in internal pressure becomes slow. As a result, the operating timing of the safety mechanism is delayed, which degrades safety (line C). Moreover, if the working pressure of another safety mechanism is lowered at the initial stage, a malfunction due to degradation in mechanical strength is highly likely to occur.

That is, if the relief valve is not provided, damage to the weld and the safety mechanism raises an issue through long-term use although the operation of the safety mechanism is satisfactory. If the relief valve is provided, the reliability in long-term use is improved, but a problem arises in the operation of the safety mechanism. Lowering the working pressure results in the likelihood of malfunctions.

On the other hand, in sealed battery 100 provided with valve 50 of the present embodiment, both the advantages of lines B and C can be achieved as indicated by a line A shown in FIG. 7. It is possible to reduce damage to the safety mechanism and to cause the safety mechanism to operate normally.

In this way, according to sealed battery 100 provided with valve 50 of the present embodiment, if gas is generated continuously and if the relationship "amount of gas emission<amount of gas generation" holds in the state (shown in FIG. 5) where gas emission path Y along which air vent 12h and exhaust hole 51h communicate with each other is formed in cap 51 in valve 50, the internal pressure of casing 10 continues rising. Therefore, by establishing the relationship "working pressure at which gas emission path Y is formed<reversal pressure of reverse plate 54<working pressure of safety mechanism", it is possible to optimize the rise in internal pressure of casing 10 and to reduce the influence on the working pressure of the safety mechanism.

Another Embodiment: Sealed Battery 100A

Figure 8:
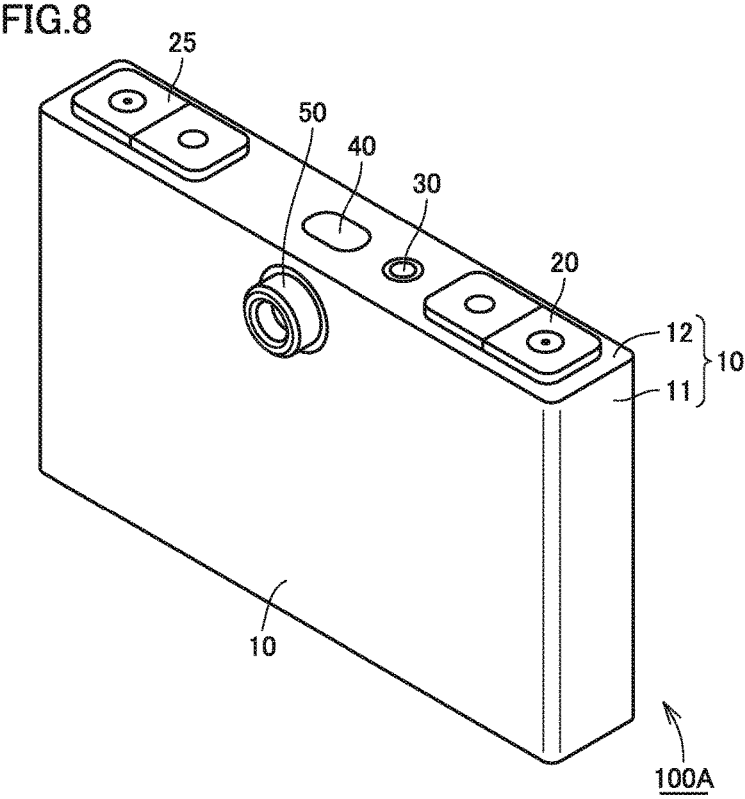
FIG. 8 is a perspective view showing the appearance of a sealed battery of another embodiment.

Referring to FIG. 8, a sealed battery 100A according to another embodiment will be described. FIG. 8 is a perspective view showing the appearance of sealed battery 100A according to another embodiment. The basic structure of this sealed battery 100A is similar to that of above-described sealed battery 100, and is different as to the position where valve 50 is attached. In above-described sealed battery 100, valve 50 is provided in lid member 12 of casing 10, while in sealed battery 100A according to the present embodiment valve 50 is provided on a side of container body 11 of casing 10. Hence, air vent 12h is also provided on the side of container body 11 in correspondence to the position where valve 50 is provided. Also by adopting this structure, it is possible to obtain operational effects similar to those of sealed battery 100.

The sealed battery according to the above-described embodiment is preferably a nonaqueous electrolyte secondary battery, and more preferably a rechargeable lithium-ion secondary battery.

The anode of the rechargeable lithium-ion battery is preferably implemented by a conventionally-known anode, and can be made of an aluminum foil, for example. The same applies to the anode current collector and the anode terminal, and they are preferably made of aluminum, for example.

The cathode of the rechargeable lithium-ion battery is preferably implemented by a conventionally-known cathode, and can be made of a copper foil, for example. The same applies to the cathode current collector and the cathode terminal, and they are preferably made of copper, for example.

The separator of the rechargeable lithium-ion battery is preferably implemented by a conventionally-known separator, and is preferably made of PE (polyethylene) or PP (polypropylene), for example.

The electrolyte or electrolytic solution of the rechargeable lithium-ion battery is preferably implemented by a conventionally-known electrolyte or electrolytic solution. For example, the electrolyte or electrolytic solution preferably contains lithium salt, such as $LiPF_6$.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A sealed battery with a battery element housed in a sealed casing, the sealed battery comprising:
   a valve brought into a closed state when an internal pressure of a gas in the casing is less than a first pressure, into an open state when the internal pressure is more than or equal to the first pressure and less than a second pressure, and into the closed state when the internal pressure is more than or equal to the second pressure; and a safety mechanism configured to, when the internal pressure reaches a third pressure exceeding the second pressure, operate in accordance with the third pressure, wherein the valve is provided to cover an air vent provided in the casing, the valve includes:
- a cap at a position opposed to the air vent, the cap provided with an exhaust hole through which the gas is emitted to the outside;
- a reverse plate housed in the cap and configured to be reversed between a state where the exhaust hole is opened and a state where the exhaust hole is closed;
- an elastic member housed in the cap and configured to bias the reverse plate toward the air vent; and
- an annular airtightness holding member provided to surround the air vent and to come into contact with an outer peripheral region of the reverse plate, wherein when the internal pressure is less than the first pressure, the reverse plate is pressed against the airtightness holding member by a biasing force of the elastic member to maintain a state where communication between the air vent and the outside of the casing is interrupted, when the internal pressure is more than or equal to the first pressure and less than the second pressure, the reverse plate moves toward the exhaust hole against the biasing force of the elastic member because of the internal pressure applied to the reverse plate, leaving a gap between the reverse plate and the airtightness holding member to cause the air vent and the exhaust hole to communicate with each other, thereby causing the gas to be emitted to the outside, and when the internal pressure is more than or equal to the second pressure, the reverse plate is reversed toward the exhaust hole to close the exhaust hole, thereby stopping emission of the gas through the exhaust hole.

2. The sealed battery according to claim 1, wherein the safety mechanism includes a mechanism configured to interrupt a flow of current generated in the battery element when the internal pressure is more than or equal to the third pressure.

3. The sealed battery according to claim 1, wherein the safety mechanism includes an explosion-proof valve configured to emit the gas in the sealed casing to the outside when the internal pressure is more than or equal to the third pressure.

* * * * *